April 9, 1946. C. V. WHALE 2,398,066
GAUGING DEVICE FOR SETTING TOOLS
Filed Aug. 29, 1944 2 Sheets-Sheet 1
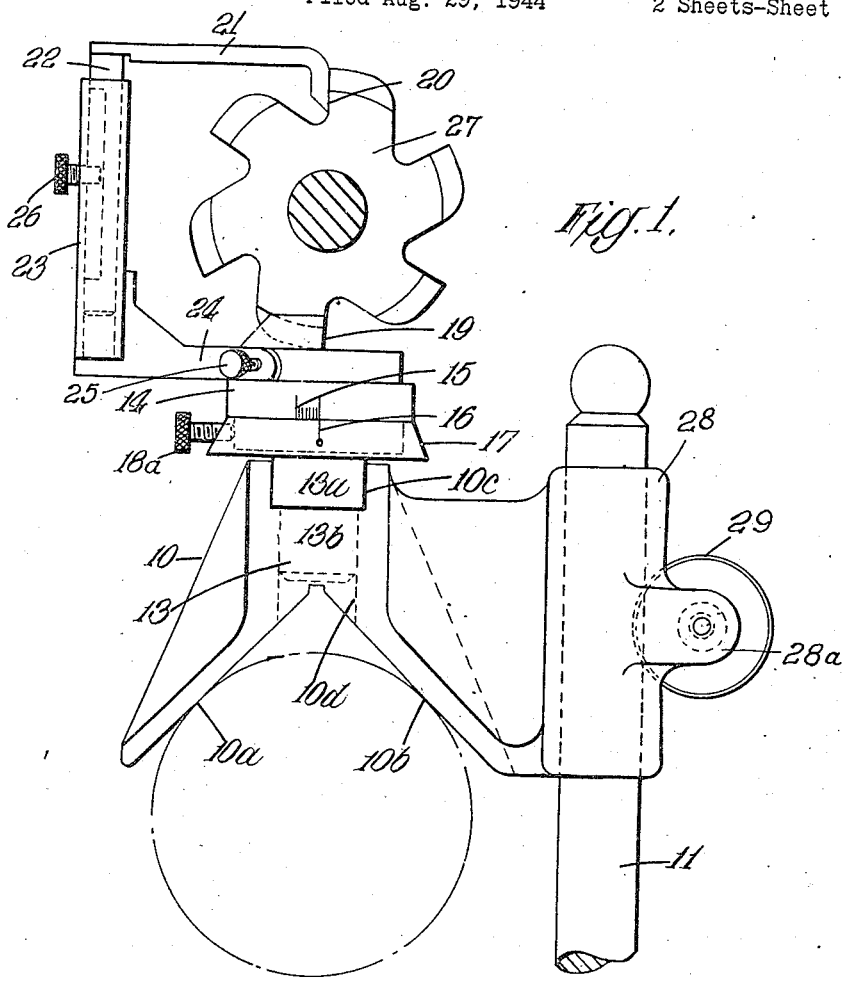
Fig.1.
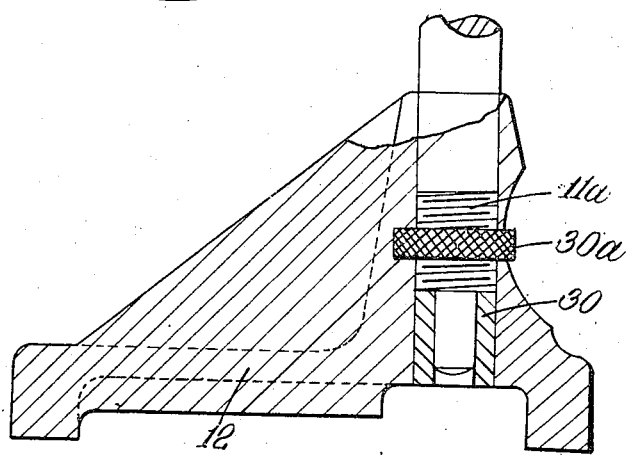
INVENTOR
CLEMENT VICTOR WHALE
BY Pennie Davis Marvin + Edmonds
ATTORNEYS April 9, 1946.  C. V. WHALE  2,398,066
GAUGING DEVICE FOR SETTING TOOLS
Filed Aug. 29, 1944  2 Sheets-Sheet 2
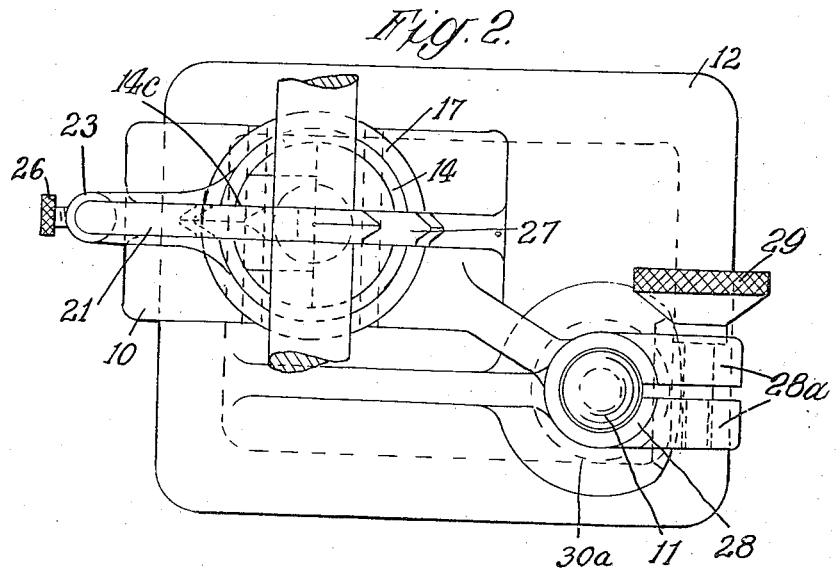
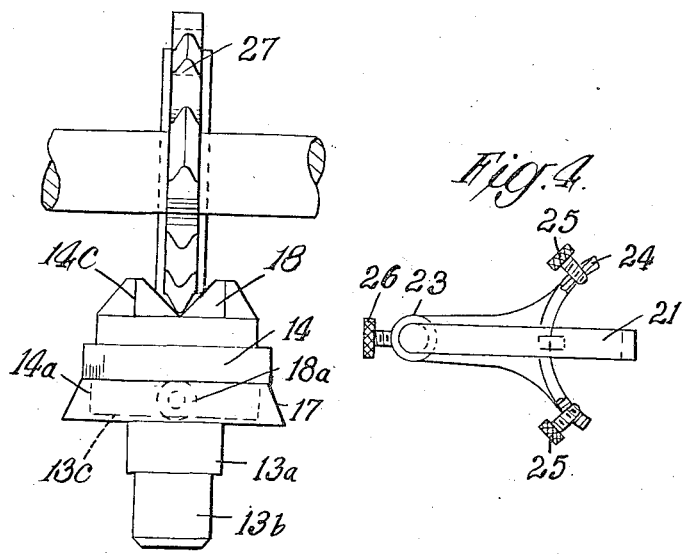
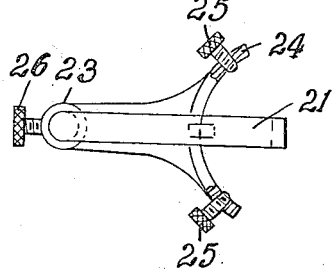

Patented Apr. 9, 1946

2,398,066

UNITED STATES PATENT OFFICE 2,398,066

GAUGING DEVICE FOR SETTING TOOLS

Clement Victor Whale, Hove, England

Application August 29, 1944, Serial No. 551,742
In Great Britain September 1, 1943

2 Claims. (Cl. 33—185)

This invention relates to improvements in setting tools for centering milling and other cutters and like tools.

The improved setting tool comprises a saddle member or head supported adjustably upon an upright rod or stem carried by a base and presenting diverging plane surfaces adapted to make line contact with the work and having in its upper face an open ended slot for the reception for interchangeable inserts, the centre line of the face of the slot lying in the central vertical plane and a hole extending therethrough at the centre of the base of the slot for the passage of a punch, drill or the like. To facilitate setting of a milling or other cutter at any desired angle to the axis of the work-piece the improved setting tool includes an insert adapted to seat in the open ended slot in the saddle member or head of the setting tool and to extend through the hole therein and a member rotatable about the vertical axis of this insert. This rotatable member is marked around its circumference so that it may be angularly adjusted with respect to a datum line marked on an adjacent surface of the insert member and is provided with means for locking it to the insert in adjusted position. The rotatable member is provided on its upper surfaces with a slot adapted in turn to receive an insert of V or other form slidably within the slot. The slot extends along one half of the surface of the rotatable member and ends in a vertical setting face which when the setting device is in position is set exactly over the axis of the work-piece. Centrally above this setting face and in correct vertical alignment with it is supported a ground setting face. This latter setting face is provided on an overhanging arm having a depending portion which is slidable in a vertical sleeve carried by a bracket secured to the rotatable member, a set screw on the sleeve engaging the depending portion and controlling the height of the setting face above the slot.

In setting the cutter or the like the rotatable part is rotated about the axis of the insert in the saddle member to the desired angle. The milling cutter is then brought to a position in which this upper setting face contacts the uppermost tooth of the cutter to be set while the lower setting face contacts the lowermost tooth of the cutter, the upper setting face being adjusted in height in accordance with the diameter of the cutter. By this means both the uppermost positioned tooth of the cutter as well as the lowermost positioned tooth of the cutter can be set at any angle in vertical alignment with the axis of both the cutter-arbor and the work-piece.

The saddle member is preferably offset in relation to the supporting rod to allow of access of the work-arbor to the insert in the saddle member.

The invention is illustrated in the accompanying drawings in which Fig. 1 is a side view partly in section of the improved setting tool with a milling cutter centered therein. Fig. 2 is a plan view of Fig. 1. Fig. 3 is a view of the cutter and the base member of the setting tool at right angles to Fig. 1 and shown detached from the setting tool. Fig. 4 is a plan view of the upper setting tool.

Referring to the drawings, the improved setting tool comprises a saddle member or head 10 supported adjustably on an upright rod or stem 11 from a base 12, the saddle member or head 10 presenting diverging plane surfaces 10a, 10b adapted to make line contact with the round bar or like work-piece on each side of and equidistant from a vertical central plane passing through the axis of the work-piece. On the side remote from the contacting surfaces of the saddle member the latter is provided with an open ended slot 10c, the centre line of the base of which lies in a central vertical plane. The head 10 is provided also with a hole 10d extending through the slot at the centre of the base of the slot 10c. The device in this form with a suitable insert can be used for setting tools such as milling cutters at a fixed angle to the work. To facilitate setting of the cutter or the like at any desired angle to the work an insert 13 is used which is formed with a portion 13a shaped to fit the open ended slot 10c in the saddle member or head and with a cylindrical portion 13b adapted to fit into the hole 10d. In an opening 13c in the insert 13 fits a cylindrical extension 14a of a member 14 which is rotatable about the vertical axis of the insert 13. This rotatable member 14 is provided with markings 15 around its circumference so that it can be angularly adjusted with respect to a datum line 16 marked on the adjacent surface 17 of the insert 13, a set screw 18a passing through the insert 13 serving to lock the rotatable member 14 to the insert 13 in an adjusted angular position. The rotatable member 14 is provided on its upper surface with a slot 14c adapted to receive an insert 18 of V or other form slidably within the slot 14c. The slot 14c extends along one half of the surface of the rotatable member and the insert 18 ends in a vertical setting face 19 which when the setting tool is in position is set exactly over the axis of the work-piece and exactly over the axis of the insert 13. Centrally above its setting face 19 and in correct vertical alignment with it is supported a ground setting face 20. This setting face 20 is formed on an overhanging arm 21 having a depending portion 22 which is slidable in a vertical sleeve 23 which is carried on a bracket 24 secured by screws 25 to the rotatable member 14, a set screw 26 on the sleeve 23 engaging the depending portion 22 and controlling the height of the setting face 20 above the head. When the rotatable member is set to any desired angle with respect to the axis of the work the upper setting face 20 contacts with the uppermost tooth of the cutter 27 or the like to be set and the lower setting face 19 is set in alignment with the lowermost cutting face on the tooth of the cutter, the upper setting face 20 being adjusted in height in accordance with the diameter of the cutter being employed. By rotation of the rotatable member 14 the uppermost and lowermost teeth of the cutter can be set at any angle in vertical alignment with the axis of the cutter arbor and the work-piece.

In the form shown, the saddle member or head 10 is provided with a split collar 28 fitting over the round rod 11 or stem and adapted to be vertically adjusted thereon and to be clamped thereto in adjusted position by means of a screw 29 engaging flanges 28a on the split collar 28. The rod or stem 11 is supported in the base in a step bearing 30 therein and is provided with a screw threaded portion 11a engageable by a nut 30a seating in a slot in the base 12 and permitting of fine adjustment of the saddle or head 10. The coarse adjustment of the head on the work is effected by the clamping screw 29 securing the head 10 on the rod or stem 11. The base 12 is shaped around the nut 30a so as to permit operation of the nut by hand. The base may be formed with angularly spaced legs providing a rigid support for the tool.

As shown the saddle member is supported in offset relation to the supporting rod 11 to allow of access of the work arbor to the insert in the saddle member.

It will be understood that in use the setting tool is positioned with the head resting on the work and the rotatable part of the insert adjusted to the angle to which the cutter is to be set in relation to the work and the cutter adjusted to the setting faces. The setting tool is then removed and the cutter lowered into operative position to the work to be treated.

I claim:
1. In a setting appliance for setting tools for treating work-pieces in combination with a base and a saddle member supported therefrom, said saddle member presenting diverging plane surfaces adapted to make line contact with the work and shaped to hold interchangeable inserts, an insert comprising a member held stationary in the saddle member and a member angularly adjustable about the axis of the stationary member said adjustable member shaped to present a tool setting face, means for locking the angularly adjustable member to the stationary member, an overhanging arm having a setting face coaxial with said first mentioned setting face and means for adjusting the height of said overhanging arm and thus of said second mentioned setting face.

2. In a setting appliance for setting tools for treating work-pieces in combination with a base and a saddle member supported therefrom, said saddle member presenting diverging plane surfaces adapted to straddle and make line contact with the work and shaped to hold interchangeable inserts, an insert comprising a member adapted to be held stationary in the saddle member and a member angularly adjustable about the vertical axis of the stationary member said adjustable member shaped to receive an insert and presenting a tool setting face, means for locking the angularly adjustable member to the stationary member, a bracket carried by said adjustable member, an overhanging arm presenting a setting face and carried by said bracket face and means for adjusting the height of said overhanging arm.

CLEMENT VICTOR WHALE.